US 12,241,682 B2

United States Patent
Miyatani (10) Patent No.: US 12,241,682 B2
(45) Date of Patent: Mar. 4, 2025

(54) EVAPORATOR

(71) Applicant: ZERO FOOD Co., Ltd., Tokyo (JP)

(72) Inventor: Shigeru Miyatani, Ashiya (JP)

(73) Assignee: Zero Food Co., Ltd., Tokyo (JP)

( * ) Notice: Subject to any disclaimer, the term of this patent is extended or adjusted under 35 U.S.C. 154(b) by 220 days.

(21) Appl. No.: 17/928,470

(22) PCT Filed: Nov. 10, 2021

(86) PCT No.: PCT/JP2021/041400
§ 371 (c)(1),
(2) Date: Nov. 29, 2022

(87) PCT Pub. No.: WO2022/102674
PCT Pub. Date: May 19, 2022

(65) Prior Publication Data
US 2023/0194139 A1  Jun. 22, 2023

(30) Foreign Application Priority Data

Nov. 10, 2020 (JP) .................... 2020-187443

(51) Int. Cl.
*F25D 3/00* (2006.01)
*F25C 5/20* (2018.01)
(Continued)

(52) U.S. Cl.
CPC ............... *F25D 3/005* (2013.01); *F25C 5/20* (2018.01); *F25D 17/042* (2013.01);
(Continued)

(58) Field of Classification Search
CPC .. F25D 3/005; F25D 17/042; F25D 2303/081; F25D 2317/0413; F25D 17/067; F25C 5/20
See application file for complete search history.

(56) References Cited

U.S. PATENT DOCUMENTS 1,299,175 A    4/1919 Gruendler
1,889,686 A *  11/1932 McKee .................. F25D 3/06
                                                  62/460
(Continued)

FOREIGN PATENT DOCUMENTS

JP    S55-108379 U    7/1980
JP    S64-22984 U     2/1989
(Continued)

OTHER PUBLICATIONS

The extended European search report dated Apr. 12, 2024 issued in the corresponding EP Patent Application No. 21891920.7.
(Continued)

*Primary Examiner* — Marc E Norman
(74) *Attorney, Agent, or Firm* — Carrier, Shende & Associates P.C.; Fulchand P. Shende; Joseph P. Carrier (57) ABSTRACT

An evaporator for a constant-temperature high-humidity storage chamber includes a cold-air temperature-humidity change unit having plurality of crushed-ice heat exchangers and a blower device to blow cold air into the cold-air temperature-humidity change unit; the plurality of crushed-ice heat exchangers each has a blade shape the width of which, in direction perpendicular to the airflow direction of the cold air, is large at the head portion and decreases toward the tail portion; the crushed-ice heat exchangers adjoining one another in the direction perpendicular to the airflow direction of the cold air such that the blade head portion of each crushed-ice heat exchanger adjoins the blade tail; thereby increasing surface area and volume of the ice forming the blade shape by crushed ice piled in the evaporator, and increasing the stability of the chamber temperature and amount of evaporation.

6 Claims, 6 Drawing Sheets

(51) Int. Cl.
  *F25D 17/04* (2006.01)
  *F25D 17/06* (2006.01)
(52) U.S. Cl.
  CPC ...... *F25D 17/067* (2013.01); *F25D 2303/081* (2013.01); *F25D 2317/0413* (2013.01)

(56) References Cited

U.S. PATENT DOCUMENTS

| | | | | |
|---|---|---|---|---|
| 1,902,246 | A * | 3/1933 | Kitchen | F24F 3/14 |
| | | | | 62/460 |
| 2,169,599 | A | 8/1939 | Stollsteimer | |
| 2004/0144108 | A1* | 7/2004 | Hwang | F25C 5/187 |
| | | | | 62/345 |
| 2023/0194139 | A1 | 6/2023 | Miyatani | |
| 2024/0019138 | A1* | 1/2024 | Kino | F25D 17/042 |

FOREIGN PATENT DOCUMENTS

| | | |
|---|---|---|
| JP | H05-332654 A | 12/1993 |
| JP | 2017-166734 A | 9/2017 |
| JP | 6559305 B2 | 8/2019 |
| WO | 2022/102674 A1 | 5/2022 |

OTHER PUBLICATIONS

Office Action dated Feb. 13, 2024 issued in a corresponding Japanese Patent Application No. 2023-102093 with an English translation thereof.

* cited by examiner

EVAPORATOR

TECHNICAL FIELD

The present invention relates to an evaporator for ice and water, configured to be used in a constant-temperature high-humidity storage chamber.

BACKGROUND ART

Constant-temperature high-humidity storage chambers (hereinafter may be referred to as the "storage chambers") have been used to store, for example, food such as meat, fish, and vegetables, which are temperature controlled articles that require temperature control, so as to keep their freshness. In general, since the enzyme activity of food has a positive correlation with the temperature of the food, the lower the storage temperature, the easier it is to keep the freshness of the food. Hence, the temperature of the constant-temperature high-humidity storage chamber is set low to keep the freshness of the food. In addition, the proliferation rates of molds, bacteria, and the like are very slow near 0° C.

However, for example, since water accounts for 70% to 80% of meat and seafood and 80% to 90% or more of fruits, in the case in which the storage chamber is set at a low temperature, −3° C. or less, and food is cooled for a long time, the food is frozen. When water turns to ice, the volume expands. The extracellular fluid of food freezes first, forming large ice crystals. This breaks the cell membranes from the outside, and the food is stored being frozen in this state. In addition, when food is stored, if the relative humidity is not higher than or equal to the water content of the food, water vapor escapes from the food into the surrounding air, and the food is dried. Specifically, in the case in which food is stored being uncovered, the relative humidity inside the storage chamber should be 80% at minimum, desirably 90% or more. The front room provided for a conventional storage chamber is aimed at keeping the low temperature of the storage chamber, and there is no front room used for keeping the humidity of the storage chamber.

When food is taken out of the storage chamber after that and unfroze, intracellular fluid and interstitial fluid from broken cells flow out, taste components and nutrients are lost along with water, and this also degrades the texture of the food. The temperature at which water turns into ice crystals is called the freezing point (hereinafter referred to as the "ice point"). As to the ice point, in the case in which pure water is slowly cooled in an environment of 1 atm, the freezing start temperature is 0° C. However, if the temperature inside the storage chamber is set on the higher side so that frozen matter will not be produced inside temperature controlled articles such as food, the activity of enzymes that decompose food becomes high, and the freshness of the food such as meat cannot be sufficiently kept at such a temperature. If the temperature inside a conventional storage chamber is set near 0° C., the chamber temperature becomes lower than or equal to the freezing temperature of food due to variation in the chamber temperature, and the frozen matter is produced in food or the like, causing problems.

To address this situation, Patent Literature 1 discloses an evaporator for a storage chamber in which a cold-air temperature-humidity change unit including crushed-ice heat exchangers is located between a first blower device and a second blower device, adjoining the first blower device and the second blower device. Because this cold-air temperature-humidity change unit has ice fed from an ice crushing unit, cold air basically comes in contact with this ice and turns into cold air including water vapor near 0° C.

Since ice melts, and melted water evaporates, water vapor fills the storage chamber. The temperature inside the storage chamber becomes near 0° C., and the relative humidity becomes near 100%, creating a high humidity environment. Thus, the food or the like stored in the storage chamber is controlled at a temperature near approximately 0° C. and at a relative humidity near 100%, and the quality can be kept.

CITATION LIST

Patent Literature

Patent Literature 1: Japanese Patent No. 6559305

SUMMARY OF INVENTION

Technical Problem

However, in this evaporator, crushed ice below the ice point produced by the ice maker is warmed to 0° C., and the surface of the ice is covered with melted water. Air is blown to falling crushed ice and lumps of crushed ice piled in the evaporators (hereinafter referred to as "lumps of crushed ice"), and melted water on the surface evaporates, producing water vapor near 0° C., which is blown into storage chamber. In normal operation, the lumps of crushed ice in the evaporator is piled up along the shape inside the evaporator from the bottom toward the top, forming an ice pillar having approximately the same shape as the evaporator. The temperature of ice and a mixture of ice and water during melting and during freezing is approximately 0° C. or near the ice point. If there are a large amount of substances having a large specific heat at the same temperature as the ice point, the heat capacity, which is the product of the specific heat at a temperature near the ice point and the mass, is large, and the temperature in the chamber is stabilized near the ice point. However, in Patent Literature 1, because the total capacity of the evaporators is small, the total amount of lumps of crushed ice is small. In addition, the surface area of the lumps of crushed ice with which blown air comes in contact is small Thus, the efficiency of humidification and cooling is poor, and the stability of the temperature is also low.

In addition, in cross-sectional view taken along a direction perpendicular to the vertical direction, the crushed-ice heat exchangers having blade shapes are arranged such that the blade heads of the cross sections of the crushed-ice heat exchangers adjoin one another along the direction of the airflow inside the cold-air temperature-humidity change unit, and the blade tails adjoin one another in this direction. In this case, the flow rate of the internal airflow introduced from the blower device is low because the internal gaps of the crushed-ice heat exchangers near the blade tails are small, and the flow rate of internal air flow flowed in is large because the gaps inside the crushed-ice heat exchangers near the blade heads are large. Thus, in the cold-air temperature-humidity change unit including the crushed-ice heat exchangers, the more downstream in the airflow direction the position is, the higher the static pressure, and the flow rate of passing airflow is low.

Hence, an object of the present invention is to provide a technical approach capable of improving the stability of the temperature and humidity by increasing the total volume of crushed ice in the internal space of an evaporator and the surface area of lumps of crushed ice with which blown air comes in contact.

Solution to Problem

An evaporator of a first aspect of the present invention is an evaporator configured to be used in a constant-temperature high-humidity storage chamber, comprising:
- at least one cold-air temperature-humidity change unit located, of a first internal space and a second internal space defined by wall portions provided in an internal space of the constant-temperature high-humidity storage chamber, in the first internal space and including a plurality of crushed-ice heat exchangers each having an internal space into which crushed ice is fed by a crushed-ice feeding device; and
- a blower device that circulates cold air between the first internal space and the second internal space, wherein
- each of the plurality of crushed-ice heat exchangers has a side wall having a plurality of holes, and
- the plurality of crushed-ice heat exchangers are arranged in parallel in the first internal space such that at least parts of the side walls having the plurality of holes are opposed to one another with an equal gap in between along a direction of airflow by the blower device.

In the evaporator of the first aspect of the present invention, a plurality of crushed-ice heat exchangers are arranged in parallel in the first internal space such that at least parts of the side walls having a plurality of holes of the plurality of crushed-ice heat exchangers are opposed to one another with an equal gap in between along the direction of airflow by the blower device. With this configuration, airflow can stably pass at an approximately constant speed through the gaps between the at least parts of the side walls opposed to one another of the crushed-ice heat exchangers adjoining in the parallel line-up direction. In other words, the flow rate of the air passing through the gaps between the crushed-ice heat exchangers adjoining in the parallel line-up direction can be equalized.

This configuration improves the efficiency of contact between the air and crushed ice fed into the internal spaces of the crushed-ice heat exchangers via the plurality of holes formed in the side walls of the crushed-ice heat exchangers, compared to conventional techniques. As a result, even in the state in which the internal spaces of the crushed-ice heat exchangers are not filled with crushed ice, the amount of air flowing in the internal spaces is sufficient. Thus, the amount of air that comes in contact with melted water on the surfaces of crushed ice increases, and a target relative humidity can be achieved with a less amount of crushed ice. This reduces the amount of ice made and saves electric power consumption and water consumption.

A constant-temperature high-humidity storage chamber is a storage chamber that stores food or the like in the state in which a constant temperature in the chamber is kept, the air in the chamber contains the saturated water-vapor density of the temperature in the chamber or a similar amount of water vapor, and a relative humidity is 80% to 100%.

In the evaporator of the first aspect, it is preferable that the number of the crushed-ice heat exchangers be three or more, and that all of the crushed-ice heat exchangers be arranged in parallel in the first internal space such that the gaps between the side walls having the plurality of holes of pairs of the crushed-ice heat exchangers adjoining each other are equal.

In the evaporator of the first aspect, it is preferable that the crushed-ice heat exchangers be arranged in the first internal space defined by the wall portions such that the gaps between the wall portions and the side walls having the plurality of holes of the crushed-ice heat exchangers opposed to the wall portions are equal along the direction of airflow by the blower device.

In the evaporator of the first aspect, it is preferable that the plurality of crushed-ice heat exchangers be each designed to have the same shape.

In the evaporator of the first aspect, it is preferable that as to the shapes of side faces of the crushed-ice heat exchangers, at least parts of the side walls of adjoining ones of the crushed-ice heat exchangers, the side walls having the plurality of holes and being opposed to each other, be formed in planar shapes or in a convex curved shape and a concave curved shape.

In the evaporator of the first aspect, it is preferable that each of the plurality of crushed-ice heat exchangers have a cross section in a blade tubular shape, and that in a parallel line-up direction of the plurality of crushed-ice heat exchangers, a blade head portion and a blade tail portion of one crushed-ice heat exchanger respectively adjoin a blade tail portion and a blade head portion of another crushed-ice heat exchanger adjoining the one crushed-ice heat exchanger.

An evaporator of a second aspect of the present invention is an evaporator configured to be used in a constant-temperature high-humidity storage chamber, comprising: at least one cold-air temperature-humidity change unit located, of a first internal space and a second internal space being defined by wall portions provided in an internal space of the constant-temperature high-humidity storage chamber, in the first internal space and including a plurality of crushed-ice heat exchangers each having an internal space that extends in the axial direction and into which crushed ice is fed by a crushed-ice feeding device; and a blower device that circulates cold air between the first internal space and the second internal space, wherein each of the plurality of crushed-ice heat exchangers has a side wall having a plurality of holes, each of the plurality of crushed-ice heat exchangers is designed to have the same shape having rotational symmetry around the axis, and the plurality of crushed-ice heat exchangers are arranged in a lattice shape in such an orientation that the shape of each crushed-ice heat exchanger has translational symmetry in the axial direction.

In the evaporator of the second aspect of the present invention, the plurality of crushed-ice heat exchangers designed to have the same shape having rotational symmetry around the axis are arranged in a lattice shape in the first internal space in such an orientation that the shape of each of the plurality of crushed-ice heat exchangers has translational symmetry in a direction perpendicular to the axis. With this configuration, airflow can stably pass at an approximately constant speed through the gaps between the plurality of crushed-ice heat exchangers. In other words, the flow rate of the air passing through the gaps between the crushed-ice heat exchangers arranged in the lattice shape can be equalized.

This configuration improves the efficiency of contact between the air and crushed ice fed into the internal spaces of the crushed-ice heat exchangers via the plurality of holes formed in the side walls of the crushed-ice heat exchangers, compared to conventional techniques. As a result, even in the state in which the internal spaces of the crushed-ice heat exchangers are not filled with crushed ice, the amount of air flowing in the internal spaces is sufficient. Thus, the amount of air that comes in contact with melted water on the surfaces of crushed ice increases, and a target relative humidity can be achieved with a less amount of crushed ice. This reduces the amount of ice made and saves electric power consumption and water consumption.

In the evaporator of the first aspect or the second aspect, it is preferable that the evaporator comprise a feeding stop mechanism that stops feeding crushed ice when the heights of lumps of crushed ice piled in all of the crushed-ice heat exchangers reach near a feeding opening of the crushed-ice feeding device.

A storage chamber of the present invention is a storage chamber comprising the evaporator of the first aspect or the second aspect in which a front room that continues to the storage chamber via the entrance of the storage chamber has a humidifier.

With the storage chamber of the present invention, since the humidifier is located in the front room where the temperature is higher than in the storage chamber, even if the temperature of air in the front room where the temperature is relatively high enters the storage chamber when the door of the storage chamber is opened and closed, the effects to the relative humidity inside the storage chamber can be small because the saturated water-vapor density is small at a low temperature.

DESCRIPTION OF EMBODIMENTS

Figure 1:
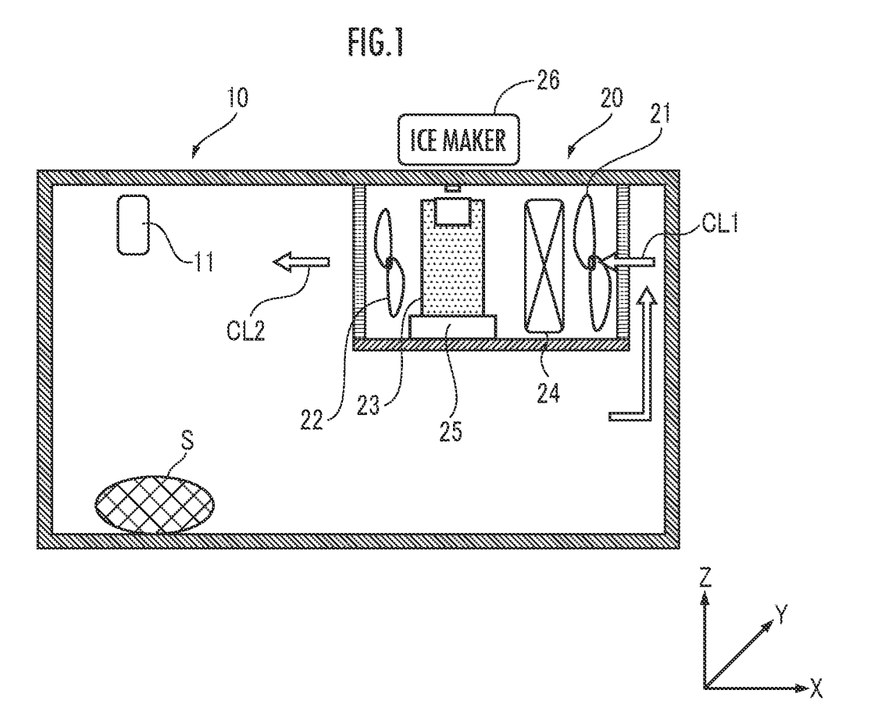
FIG. 1 is a schematic configuration explanatory diagram of a storage chamber according to an embodiment of the present invention.
Figure 2:
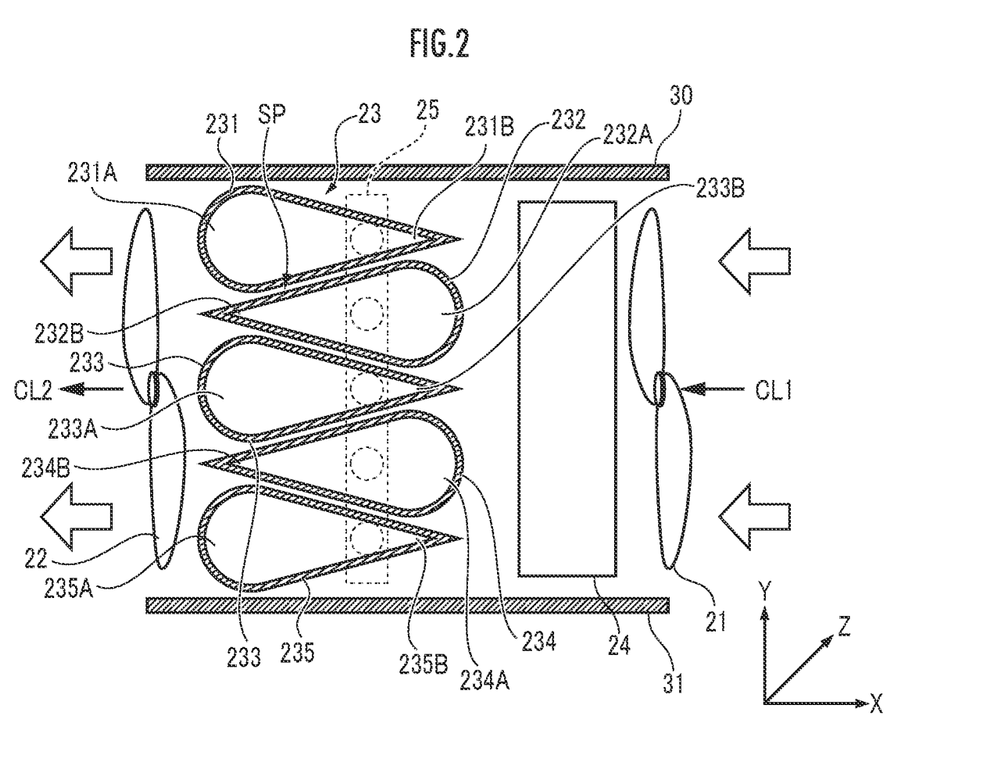
FIG. 2 is a schematic configuration explanatory diagram of an evaporator according to the embodiment of the present invention.

FIG. 1 shows a schematic configuration of a constant-temperature high-humidity storage chamber according to a first embodiment of the present invention. FIG. 2 is a schematic horizontal-sectional view or a cross-sectional view of an evaporator shown in FIG. 1.

As shown in FIG. 1, in the present embodiment, the constant-temperature high-humidity storage chamber (hereinafter may be referred to as the "storage chamber") 10 comprises an in-chamber temperature-humidity sensor 11 and an evaporator 20 in its internal space (a second internal space). The in-chamber temperature-humidity sensor 11 measures the temperature and humidity in the storage chamber 10.

Figure 3:
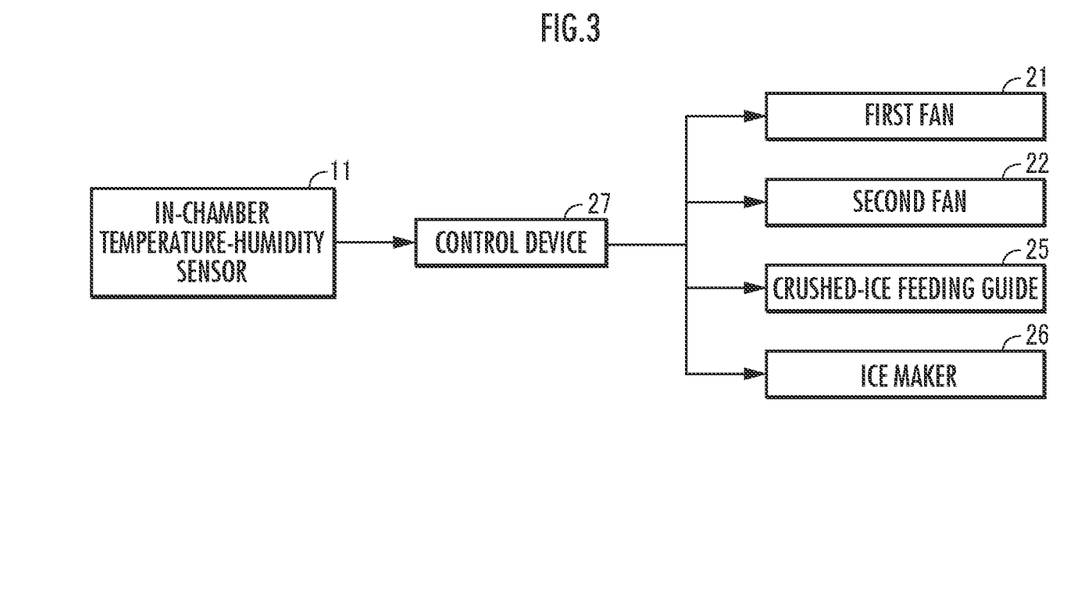
FIG. 3 is a block diagram of the evaporator according to the embodiment of the present invention.

Note that the temperature and the humidity detected by this sensor are sent to a control device (controller) 27, and based on the measured temperature and the measured humidity, this control device 27 controls the operation of a first blower device, a second blower device, and the like described below. FIG. 3 shows a block diagram including the above control device.

The second internal space of the storage chamber 10 stores food such as meat, fish, and vegetables as stored articles S.

As shown in FIGS. 1 and 2, the evaporator 20 comprises the first blower device 21, the second blower device 22, and a cold-air temperature-humidity change unit 23 located between the first blower device 21 and the second blower device 22. Each of the first blower device 21 and the second blower device 22 comprises, for example, a rotary drive device such as an electric motor, a rotary shaft coupled to the output shaft of the rotary drive device and configured to be driven to rotate, and blades attached to the rotary shaft so as to protrude in directions perpendicular to the axial direction. The cold-air temperature-humidity change unit 23 comprises a plurality of crushed-ice heat exchangers (hereinafter may be referred to as "heat exchangers") 231 to 235 arranged in parallel in a certain direction in a first internal space.

The air taken from the second internal space into the first internal space by the first blower device 21 passes through the cold-air temperature change unit 23 including the crushed-ice heat exchangers 231 to 235 and is sent out from the first internal space to the second internal space by the second blower device. A temperature adjuster 24, which is located on the second blower device 22 side of the first blower device 21, controls the temperature of first airflow CL1 sent from the first blower device 21 at the time when it is blown to the cold-air temperature-humidity change unit 23.

As shown in FIG. 2, each of the heat exchangers 231 to 235 has a blade shape in cross-sectional view taken along a direction perpendicular to its axial direction, the blade shape having a combination of an approximately arc shape and an approximately isosceles triangle the base of which is the bowstring of the arc shape. The arcs or vertexes of the approximately arc shapes form blade head portions 231A to 235A, and the vertexes of the approximately isosceles triangles form blade tail portions 231B to 235B. The plurality of heat exchangers 231 to 235 are arranged such that the blade head portion of each one of the heat exchangers adjoining one another in the parallel line-up direction (the up-down direction in FIG. 2) in the plurality of heat exchangers 231 to 235 adjoins the blade tail portion of another heat exchanger.

As clearly seen from FIGS. 1 and 2, each of the heat exchangers 231 to 235 has a tubular member the axial direction of which extends approximately in parallel with the vertical direction (including cases in which the axial direction is inclined at 30 degrees or less) and that has an internal space for holding introduced crushed ice. An ice maker 26 and a crushed-ice feeding guide 25 having a screw conveyor (not illustrated) for introducing crushed ice into the internal spaces are located above each of the heat exchangers 231 to 235. Although in the present embodiment, the heat exchangers 231 to 235 having approximately blade tubular shapes are arranged to have such orientations that each axial direction extends approximately in parallel with the vertical direction, the heat exchangers 231 to 235 having approximately blade tubular shapes may be arranged to have such orientations that each axial direction extends approximately in parallel with the horizontal direction.

Side walls of the heat exchangers 231 to 235 have a large number of holes. The first airflow sent from the first blower device 21 gets into and out of the insides of the heat exchangers to be cooled and humidified by these heat exchangers 231 to 235, and forms second airflow.

Although the number of heat exchangers arranged in parallel in a certain direction is "five" in the present embodiment, the number may be two or more and less than five, or may be six or more.

Each of the heat exchangers 231 to 235 is made of, for example, stainless steel, copper, or the like and can be formed, for example, by punching a large number of holes in a metal plate made of one of these materials and folding the metal plate. Note that the first blower device 21 and the second blower device 22 may be made of a rust-resistant metal, for example, stainless steel.

In the present embodiment, first, the first blower device 21 introduces first cold air CL1 into the temperature adjuster 24. In the case in which the temperature in the chamber is +1° C. or more, the temperature of the first airflow CL1 is controlled here to be, for example, −5 to −10° C. by the temperature adjuster 24, and then the first airflow CL1 is introduced into the cold-air temperature-humidity change unit 23 including the plurality of heat exchangers 231 to 235. In the cold-air temperature-humidity change unit 23, the ice maker 26 introduces crushed ice into the insides of the heat exchangers 231 to 235 via the crushed-ice feeding guide 25.

Then, while the first airflow CL1 introduced into the cold-air temperature-humidity change unit 23 is passing through air paths SP between the heat exchangers 231 to 235 included in the cold-air temperature-humidity change unit 23, the first airflow CL1 comes in contact with the crushed ice fed into the internal spaces of the heat exchangers 231 to 235 in a falling manner, via the wall surfaces of the heat exchangers 231 to 235. The airflow passes through the holes formed in the side walls of the heat exchangers 231 to 235, enters the internal spaces of the heat exchangers, and comes into direct contact with crushed ice. The cold air of the temperature adjuster freezes the surface melted water, the latent heat of solidification is released, and the temperature of the water vapor in the first airflow CL1 increases to 0° C. Note that because the cold air or the airflow CL2 including water vapor at 0° C. is mixed with, for example, the air inside the chamber, its temperature is within a range of −1° C. to +0.5° C.

The operation of each of the screw conveyor and the ice maker which feed crushed ice is controlled by the control device 27 based on output signals of a crushed-ice-position detection infrared sensor (not illustrated) attached near the crushed-ice input opening (for example, the opening at the upper portion) of the heat exchanger 235. Specifically, the operation of each of the screw conveyor and the ice maker continues until the crushed-ice-position detection infrared sensor detects that the position of the uppermost portion of lumps of crushed ice piled in the internal space of each of the heat exchangers 231 to 235 has reached a specified position, so that crushed ice is fed in the internal space of each of the heat exchangers 231 to 235. For example, the first heat exchanger 231 and then sequentially the heat exchangers 232, 233, and 234 become full, and lastly when the heat exchanger 235 becomes full, feeding crushed ice is stopped. When one hour has passed since the feeding stop, the operation of the screw conveyor and the ice maker is resumed, and crushed ice is fed. Lumps of crushed ice form the same blade shape as the shape of the heat exchanger. When crushed ice feeding continues, and the heat exchangers become full, lumps of crushed ice reaches near the crushed-ice feeding openings. Comparing when the heat exchangers are full with when they are not full, when the heat exchangers are full, the volume of ice and the surface area are sufficient. When air in the chamber having a temperature higher than 0° C. is blown, lumps of crushed ice are melted and vaporized or sublimated, depending on the positions, and the lumps of crushed ice become smaller.

In addition, ice melts, the melted water vaporizes, generating water vapor at 0° C. The water vapor is mixed with the above first airflow CL1, forming the second airflow CL2. Note that as described above, since the first airflow CL1 enters the internal spaces of the heat exchangers 231 to 235 through the holes formed in the side walls of the heat exchangers, the efficiency of mixing the first airflow CL1 and the water vapor increases.

The second airflow CL2 is cold air having a temperature near approximately 0° C. and a relative humidity near 80% to 100%. This second airflow CL2 is introduced into the storage chamber 10 by the second blower device 22. Thus, the stored articles S such as food stored in the storage chamber 10 is controlled at a temperature near approximately 0° C. and at a relative humidity near 100%, and this makes it possible to keep the quality.

Note that as described above, the temperature and humidity of the second internal space of the storage chamber 10 are measured by the in-chamber temperature-humidity sensor 11, and the control device 27 is configured to adjust the flow rate of the first airflow CL1 by using the first blower device 21, the temperature adjustment of the first airflow CL1 by the temperature adjuster 24, and the amount of crushed ice to be fed in the cold-air temperature-humidity change unit 23 so that the temperature of the second internal space of the storage chamber 10 is constantly kept near 0° C., and the relative humidity is constantly kept near 100%.

When the temperature measured by the in-chamber temperature-humidity sensor 11 is higher than +1° C., for example, as shown in FIG. 3, the control device 27 operates the temperature adjuster 24 to blow, for example, cold air at −10° C. to the cold-air temperature-humidity change unit 23. The temperature measured by the in-chamber temperature-humidity sensor 11 is lower than 0° C., the control device 27 stops the operation of the temperature adjuster 24.

Note that it is desired that when the temperature measured by the in-chamber temperature-humidity sensor 11 is lower than +1° C., and the measured humidity is lower than 95%, the temperature adjuster be stopped, and the first blower device 21 and the second blower device 22 be in operation, so that air at a temperature higher than the temperature inside the chamber, 0° C., is blown to the evaporator, and that the humidity inside the storage chamber 10 becomes saturated. When the measured humidity is 100%, the operation of the ice maker 26 and the screw conveyor is stopped. Here, since it is hot and humid in Japan, and it is less likely that the chamber humidity becomes extremely low in the main island of Japan and all parts south, the control by the relative humidity may be eliminated.

In the evaporator of the first embodiment and the storage chamber comprising the same, the heat exchangers 231 to 235 are arranged such that the blade head portions 231A to 235A and the blade tail portions 231B to 235B adjoin to one another, and the gaps on the first airflow CL1 introduction side and the gaps on the second airflow CL2 releasing side, in other words, the widths of the air paths SP between adjoining heat exchangers are approximately equal along the airflow direction. Thus, the air speed on the first airflow CL1 introduction side and the air speed on the second airflow CL2 releasing side are approximately equal. Thus, cold air can pass stably through the air paths SP between the heat exchangers, in other words, inside the cold-air temperature-humidity change unit 23. This configuration, compared to conventional ones, makes the static pressure in the cold-air temperature-humidity change unit, in other words, in the evaporators low and makes the flow rate of passing air high. As a result, the flow rate of passing air increases, the amount of air that comes in contact with melted water on the surfaces of crushed ice increases, and the amount of crushed ice to be made to achieve a target relative humidity can be smaller. This saves electric power consumption and water consumption.

Note that the existence of the temperature adjuster 24 makes it possible to adjust the temperature of the first airflow CL1 blown from the first blower device 21 as appropriate, and makes it easy to control the temperature (approximately 0° C.) of the air passing through the cold-air temperature-humidity change unit 23.

In the present embodiment, since the cross-sectional shape of lumps of crushed ice piled in the evaporator is a blade shape, and the blade heads and the blade tails adjoin one another, the volume and the surface area of lumps of crushed ice inside the evaporator are increased, and in addition, the amount of air that comes in contact with the surfaces of lumps of crushed ice is increased, so that the efficiency can be increased.

According to Patent Literature 1, a 33 m² prefabricated constant-temperature high-humidity storage chamber of a comparative example having a temperature of 0° C.±1° C. and a relative humidity of 90%±5% was built (hereinafter referred to as the "storage chamber ΛΛ"). The evaporator included in the storage chamber ΛΛ of the comparative example comprises a cold-air temperature-humidity change unit including a plurality of heats exchangers having blade tubular shapes arranged such that a blade head portion and a blade tail portion of one heat exchanger having a blade tubular shape and a blade head portion and a blade tail portion of another heat exchanger having a blade tubular shape located in parallel with the one heat exchanger having a blade tubular shape are respectively opposed to each other in the parallel line-up direction. After the chamber temperature becomes 0° C., and the relative humidity becomes near 90%, the average water consumption of the ice maker for one day with the alternating current 60 Hz, a single-phase 100V, and the electric power consumption 493 W was measured.

According to the embodiment of the present invention, a storage chamber (hereinafter referred to as the "storage chamber ΛV") of an implementation example was built. The evaporator included in the storage chamber ΛV of the implementation example comprises a cold-air temperature-humidity change unit including a plurality of heat exchangers having blade tubular shapes arranged such that the blade head portion and the blade tail portion of one heat exchanger having a blade tubular shape and the blade tail portion and the blade head portion of another heat exchanger having a blade tubular shape located in parallel with the one heat exchanger having the blade tubular shape are respectively opposed to each other in the parallel line-up direction. The average water consumption of the ice maker was measured under the conditions the same as the measurement conditions of the comparative example.

Results:

Table 1 shows the measurement results of the implementation example and the comparative example.

TABLE 1

| Storage Chamber VV | | Storage Chamber ΛV- | | Storage Chamber ΛVI | |
|---|---|---|---|---|---|
| Water Consumption | Electric Power Consumption | Water Consumption | Electric Power Consumption | Water Consumption | Electric Power Consumption |
| 68 l/day | 8.14 kWh/day | 64 l/day | 7.67 kWh/day | 62 l/day | 7.43 kWh/day |

As shown in Table 1, the storage chamber of the implementation example can reduce the electric-power consumption and water consumption, compared to the storage chamber of the comparative example.

Some embodiments of the present invention have been described above, but these embodiments are shown as examples and are not intended to limit the scope of the invention. These new embodiments may be implemented with other various forms, and various kinds of elimination, replacement, or modification are possible within a range not departing from the spirit of the invention. Theses embodiments and modifications thereof are included in in the scope and sprit of the invention and included in the invention stated in the claims and the equivalents thereof.

The present method can be even applied to the case in which the temperature and humidity set for the inside of the chamber is +10° C. and 80% or more relative humidity, which is a high humidity. In that case, it is desirable that feeding of crushed ice start after lumps of crushed ice are melted to near the bottom surface of the evaporator. To increase the amount of lumps of crushed ice melted in the evaporator, the average operation speed of the screw conveyor is set to be slow. Thus, melting of the ice surfaces progresses in the guide of the crushed-ice feeding unit, and this increases the amount of evaporation in blowing air. When the amount of evaporation is large, the heat of evaporation help with cooling, and this reduces the burden of the temperature adjuster, leading to electric power saving. Because the decomposition speed of ATP in fish is slowest at +10° C., this setting is used to keep the freshness of fresh fish in such a case that a fresh hard feel when bitten is desired. In addition, although the reason is unclear, it is said that +10° C. is suitable for the temperature for storing wine, Japanese sake, and the like from experience.

Although in the embodiments, the first blower device 21 and the second blower device 22 are located in the first internal space defined by the wall portions, part or all of the constituents of the first blower device 21 and/or the second blower device 22 may be located in the second internal space. To circulate air between the first internal space and the second internal space, instead of two, a single or three or more blower devices may be provided. On the flow path of airflow by blower devices, a plurality of other first internal spaces each including a cold-air temperature-humidity change unit may be defined by the wall portions.

Although the shape of each crushed-ice heat exchanger has a blade shape in top view, the shape does not have to be a blade shape as long as the air paths SP can be formed, the flow rate of passing air is sufficient, the amount of flowing air that comes in contact with melted water on the surfaces of crushed ice is large, a target relative humidity can be achieved with a smaller amount of crushed ice, the amount of ice made is reduced, and the electric power consumption and water consumption can be saved.

Figure 4:
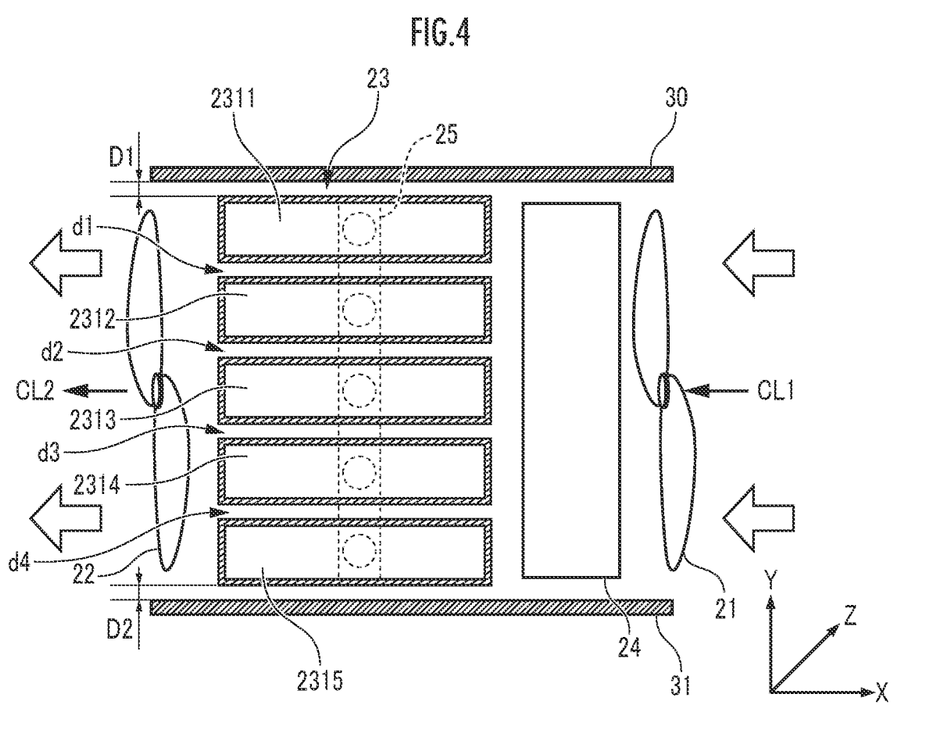
FIG. 4 is a schematic configuration explanatory diagram of an evaporator according to another embodiment of the present invention.

For example, as shown in FIG. 4, in a first internal space defined by a pair of wall portions 30, 31 extending in the right-left direction of FIG. 4, a plurality of crushed-ice heat exchangers 2311 to 2315 having approximately rectangular tubular shapes are arranged in parallel in the up-down direction of FIG. 4. Each of the crushed-ice heat exchangers 2311 to 2315 is oriented such that a pair of long-side side walls extend in the right-left direction of FIG. 4 (and such that a pair of short-side side walls extend in the up-down direction of FIG. 4), and the long-side side walls have a plurality of holes. The internal space of each of the crushed-ice heat exchangers 2311 to 2315 having approximately rectangular tubular shapes is fed with crushed ice from an ice maker.

Although the plurality of crushed-ice heat exchangers 2311 to 2315 shown in FIG. 4 are all designed to have the same shape, as long as the gap of parts of the side walls opposed to each other of crushed-ice heat exchangers adjoining in the parallel line-up direction is approximately equal in the airflow direction, the shapes of the adjoining crushed-ice heat exchangers may be different. For example, adjoining crushed-ice heat exchangers may both have rectangular tubular shapes, or the rectangles may be analogous.

The crushed-ice heat exchanger 2311 and 2315 are arranged in the first internal space such that the gap D1 between one wall portion 30 and the crushed-ice heat exchanger 2311 closest to this wall portion 30 is equal to the gap D2 between the other wall portion 31 and the crushed-ice heat exchanger 2315 closest to this wall portion 31. The gaps D1 and D2 may be different.

The heat exchangers 2311 to 2315 are arranged in the first internal space such that the gaps d1, d2, d3, and d4 between the crushed-ice heat exchangers 2311 to 2315 adjoining one another in the parallel line-up direction (the up-down direction of FIG. 4) shown in FIG. 4 are equal. The gap between a pair of heat exchangers may be different from the gap between another pair of heat exchangers.

The gaps are designed such that the equations D1=D2=d1=d2=d2=d3=d4 hold. The gaps may be designed such that the relational expressions D1=D2≠d1=d2=d2=d3=d4 hold.

Although the entire long-side side walls of the crushed-ice heat exchangers adjoining in the parallel line-up direction are opposed to one another as shown in FIG. 4, the crushed-ice heat exchangers may be arranged such that only parts of the long-side side walls of the crushed-ice heat exchangers adjoining in the parallel line-up direction are opposed to one another. For example, the crushed-ice heat exchanger 2311 may be shifted in the X-axis direction (in the right-left direction of FIG. 4).

The side walls of the crushed-ice heat exchangers opposed to one another have approximately planar shapes. In other possible configurations, at least part of a side wall of one crushed-ice heat exchanger is designed to have a convex curved shape (at least part of the side wall of the outline of one crushed-ice heat exchanger in a cross section is designed to have a convex curved line), at least part of the side wall of another crushed-ice heat exchanger is designed to have a concave curved shape (at least part of the side wall of the outline of another crushed-ice heat exchanger in the cross section is designed to have a concave curved line), and the gap between the at least parts of the side walls may be a curved plate shape having an approximately constant curvature or a curved plate shape with no curvature polarity change.

Figure 5:
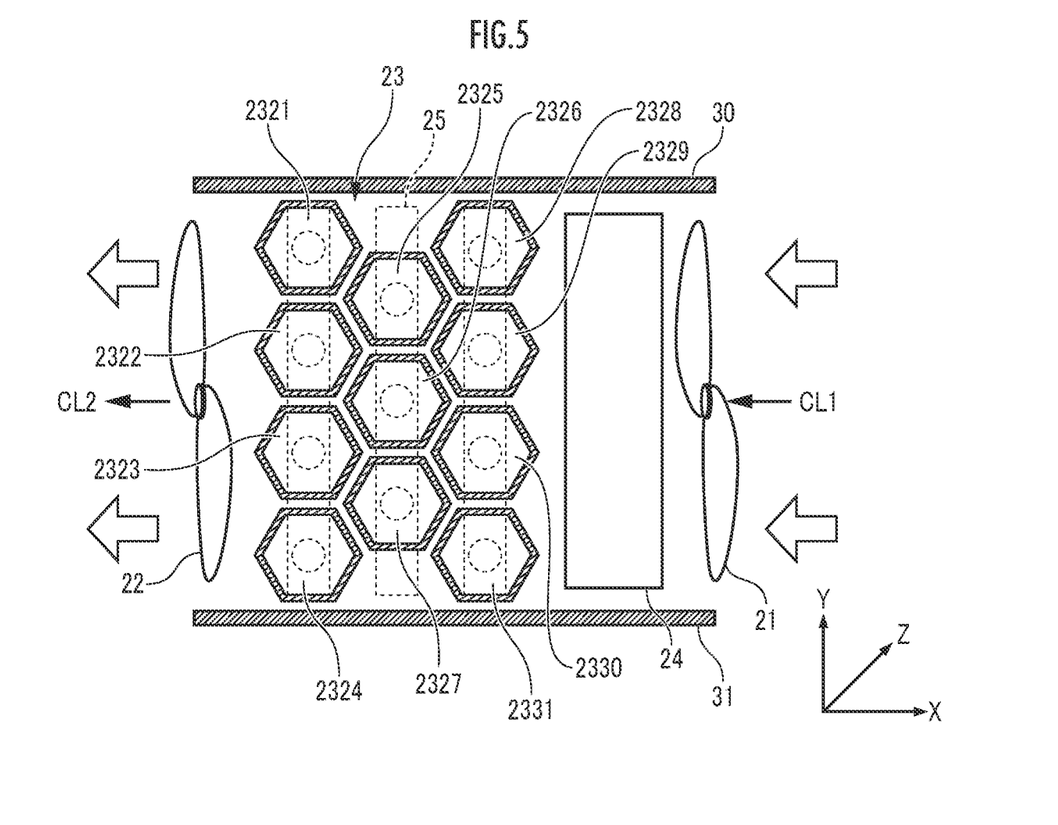
FIG. 5 is a schematic configuration explanatory diagram of an evaporator according to another embodiment of the present invention.

An evaporator according to a second embodiment of the present invention, shown in FIG. 5 comprises a cold-air temperature-humidity change unit 23 including a plurality of crushed-ice heat exchangers 2321 to 2331 each of which has an approximately regular hexagonal tubular shape and the center axes of which are arranged in regular triangular lattice shapes.

The plurality of crushed-ice heat exchangers 2321 to 2331 are arranged in the first internal space in such an orientation that each crushed-ice heat exchanger has translational symmetry in the direction perpendicular to the axial direction. For example, as shown in FIG. 5, the plurality of crushed-ice heat exchangers 2321 to 2331 are arranged such that a pair of side walls opposed to each other of the crushed-ice heat exchangers 2321 to 2331 are approximately in parallel with the pair of wall portions defining the first internal space. At least each of the pair of side walls has a plurality of holes. The internal spaces of the crushed-ice heat exchangers 2321 to 2331 having approximately regular hexagonal tubular shapes are fed with crushed ice from an ice maker.

Figure 6:
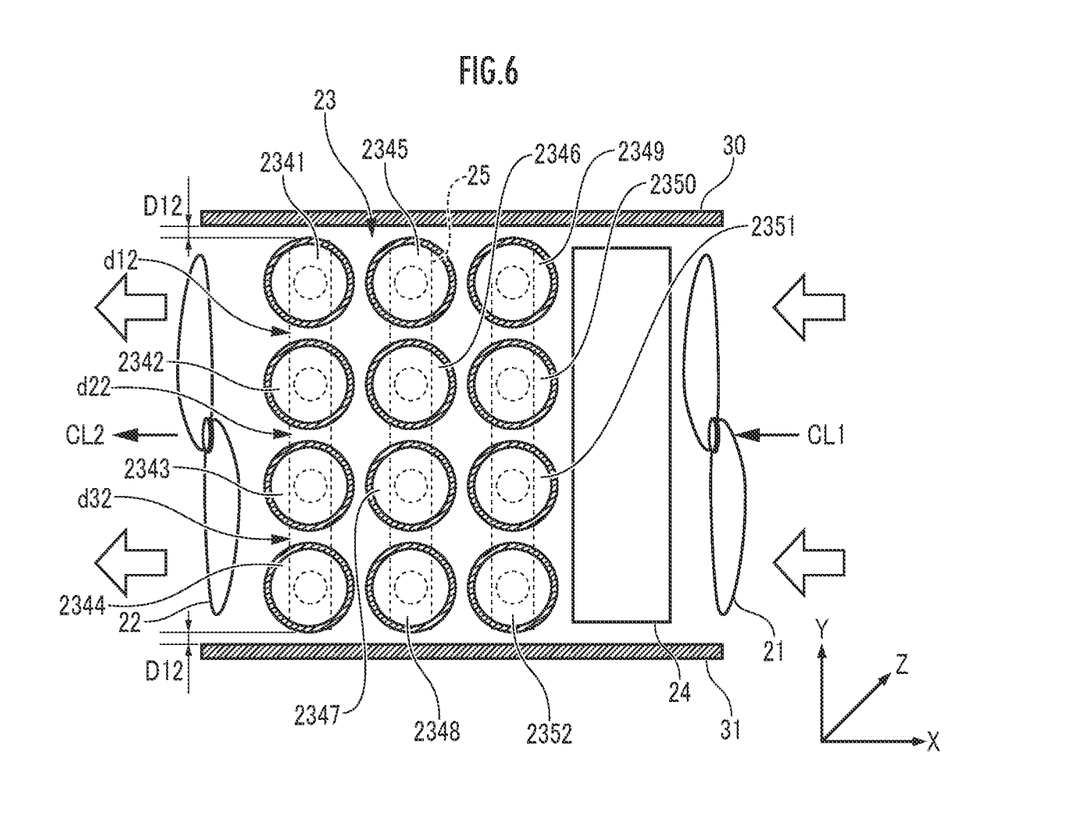
FIG. 6 is a schematic configuration explanatory diagram of an evaporator according to another embodiment of the present invention.

An evaporator according to the second embodiment of the present invention, shown in FIG. 6 comprises a cold-air temperature-humidity change unit 23 including a plurality of crushed-ice heat exchangers 2341 to 2352 each of which has an approximately cylindrical tubular shape and the center axes of which are arranged in regular quadrangular lattice shapes.

The crushed-ice heat exchangers 2341 and 2352 are arranged in the first internal space such that the gap D12 between one wall portion 30 and the crushed-ice heat exchanger 2341 closest to this wall portion 30 is equal to the gap D22 between the other wall portion 31 and the crushed-ice heat exchanger 2352 closest to this wall portion 31. The gaps D12 and D22 may be different.

The heat exchangers 2341 to 2352 are arranged in the first internal space such that the gaps d12, d22, and d32 between the crushed-ice heat exchangers 2341 to 2352 adjoining one another in the parallel line-up direction (the up-down direction of FIG. 6) shown in FIG. 6 are equal. The gap between a pair of heat exchangers may be different from the gap between another pair of heat exchangers.

The gaps are designed such that the equations D12=D22=d11=d21=d31 hold. The gaps may be designed such that the relational expressions D12=D21≠d12=d22=d32 hold.

The gaps between the crushed-ice heat exchangers in the lattice direction in FIGS. 5 and 6 are designed appropriately in consideration of the easiness of the airflow.

A plurality of heat exchangers designed to have the same rotationally symmetrical shape may be arranged, instead of in a regular triangular lattice shape, in another lattice shape such as an orthorhombic lattice shape, a square lattice shape, a rectangular lattice shape or a parallel lattice shape.

The heat exchangers may have, instead of an approximately regular hexagonal tubular shape, a shape having rotational symmetry around the center axis such as an approximately circular tubular shape, an approximately elliptical tubular shape, and an approximately regular polygonal tubular shape. As in the case in which the heat exchangers have approximately circular tubular shapes, the space or the air paths between the side walls of adjoining heat exchangers do not have to extend along the direction of airflow by the blower device.

REFERENCE SIGNS LIST 10 low-temperature high-humidity storage chamber
11 in-chamber temperature-humidity sensor
20 evaporator
21 first blower device
22 second blower device
23 cold-air temperature-humidity change unit
231, 232, 233, 234, 235, 2311 to 2315, 2321 to 331, 341 to 2352 crushed-ice heat exchanger
231A to 235A blade head of crushed-ice heat exchanger
231B to 235B blade tail of crushed-ice heat exchanger
24 temperature adjuster
25 crushed-ice feeding guide
26 ice maker
27 control device
CL1, CL2 airflow
d1 to d4, d12, d22, d32 gap between crushed-ice heat exchangers
D1, D2 gap between crushed-ice heat exchanger and housing
SP air path
X lateral direction
Y depth direction
Z height direction

The invention claimed is:

1. An evaporator configured to be used in a constant-temperature high-humidity storage chamber, comprising:
   at least one cold-air temperature-humidity change unit located, of a first internal space and a second internal space defined by wall portions provided in an internal space of the constant-temperature high-humidity storage chamber, in the first internal space and including a plurality of crushed-ice heat exchangers each having an internal space into which crushed ice is fed; and
   a blower device that circulates cold air between the first internal space and the second internal space, wherein
   each of the plurality of crushed-ice heat exchangers has a side wall,
   the plurality of crushed-ice heat exchangers are arranged in parallel in the first internal space such that at least parts of the side walls are opposed to one another with an equal gap in between along a direction of airflow by the blower device,
   each of the plurality of crushed-ice heat exchangers has a cross section in a blade tubular shape, and
   in a parallel line-up direction of the plurality of crushed-ice heat exchangers, a blade head portion and a blade tail portion of one crushed-ice heat exchanger respectively adjoin a blade tail portion and a blade head portion of another crushed-ice heat exchanger adjoining the one crushed-ice heat exchanger.

2. The evaporator according to claim 1, wherein
   the number of the crushed-ice heat exchangers is three or more, and
   all of the crushed-ice heat exchangers are arranged in parallel in the first internal space such that the gaps between the side walls of pairs of the crushed-ice heat exchangers adjoining each other are equal.

3. The evaporator according to claim 1, wherein
   the crushed-ice heat exchangers are arranged in the first internal space defined by the wall portions such that gaps between the wall portions and the side walls of the crushed-ice heat exchangers opposed to the wall portions are equal along the direction of airflow by the blower device.

4. The evaporator according to claim 1, wherein
   the plurality of crushed-ice heat exchangers are each designed to have a same shape.

5. The evaporator according to claim 1, wherein
   as to shapes of side faces of the crushed-ice heat exchangers, at least parts of the side walls of adjoining ones of the crushed-ice heat exchangers, the side walls being opposed to each other, are formed in planar shapes or in a convex curved shape and a concave curved shape.

6. The evaporator according to claim 1, further comprising a feeding stop mechanism that stops feeding crushed ice when heights of lumps of crushed ice piled in all of the crushed-ice heat exchangers reach a specified position.

* * * * *